Dec. 26, 1950
A. M. STONER
2,535,553
FRUIT JUICE EXTRACTOR WITH A PIVOTALLY MOUNTED ROTATABLE REAMER
Filed March 3, 1948
2 Sheets-Sheet 1
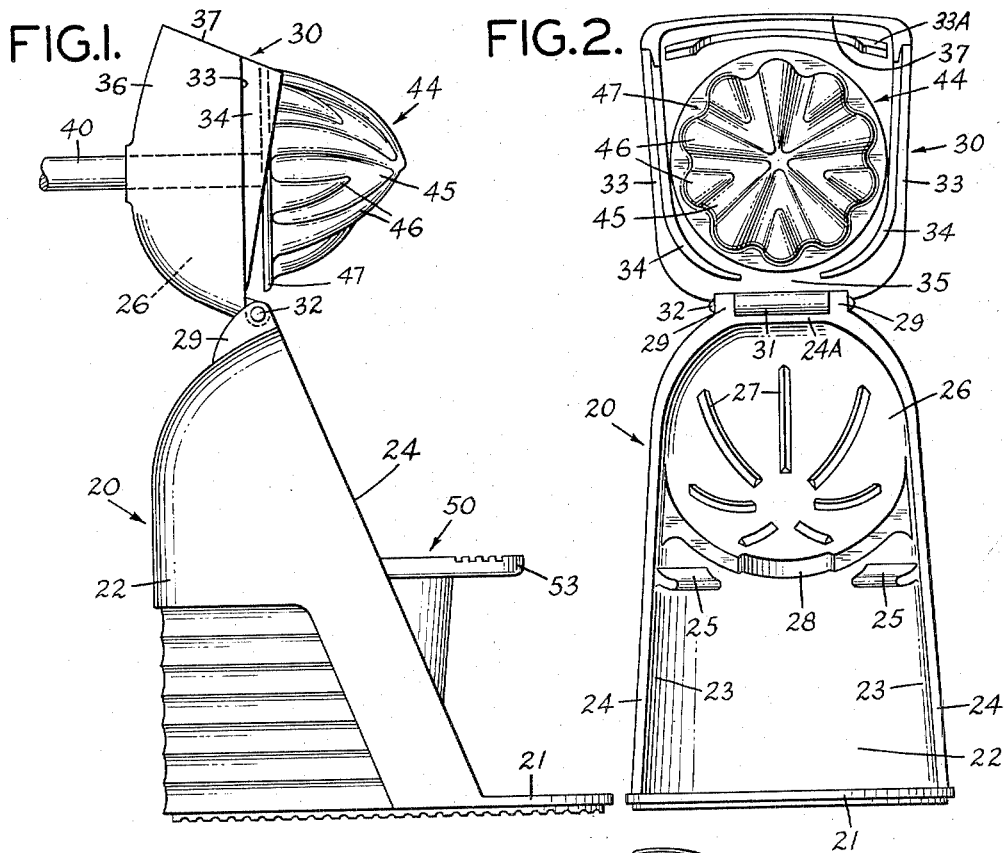
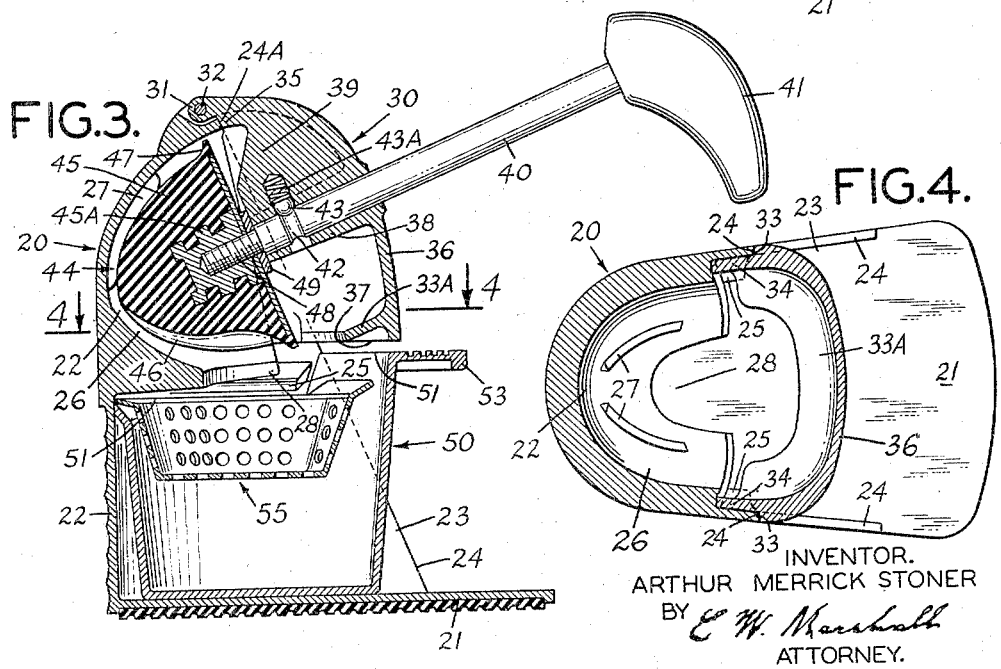
INVENTOR.
ARTHUR MERRICK STONER
BY E. W. Marshall
ATTORNEY.

Dec. 26, 1950 — A. M. STONER — 2,535,553
FRUIT JUICE EXTRACTOR WITH A PIVOTALLY MOUNTED ROTATABLE REAMER
Filed March 3, 1948 — 2 Sheets-Sheet 2
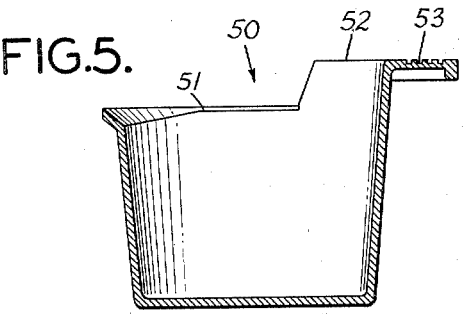
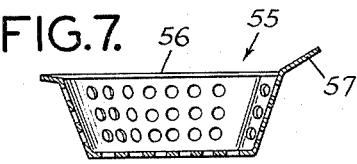
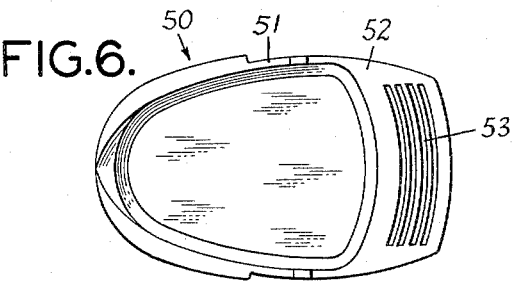
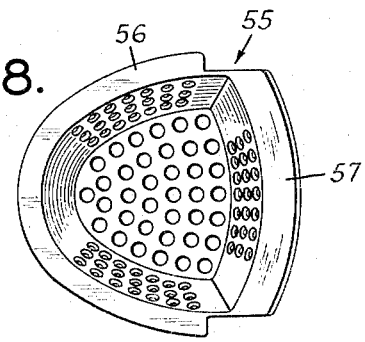
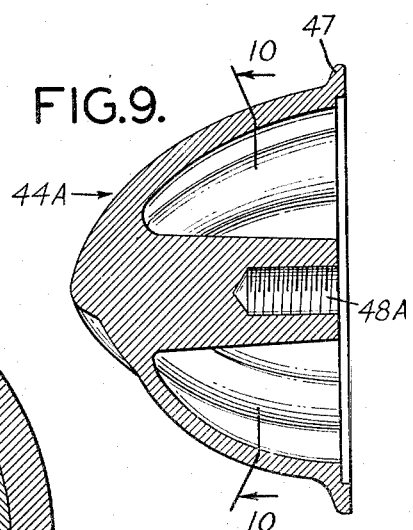
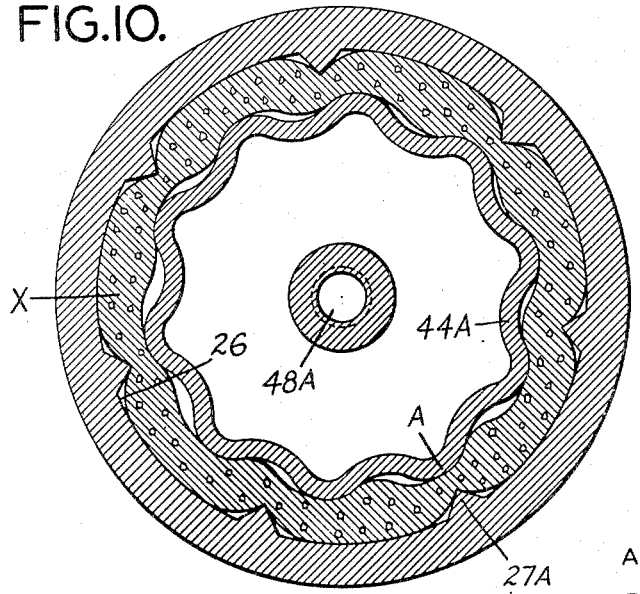
INVENTOR.
ARTHUR MERRICK STONER
BY E. W. Marshall
ATTORNEY.

Patented Dec. 26, 1950

2,535,553

UNITED STATES PATENT OFFICE 2,535,553

FRUIT JUICE EXTRACTOR WITH A PIVOT-ALLY MOUNTED ROTATABLE REAMER

Arthur Merrick Stoner, West Hartford, Conn., assignor to The Hartford Products Corporation, Hartford, Conn., a corporation of Connecticut Application March 3, 1948, Serial No. 12,770

3 Claims. (Cl. 146—3)

This invention relates to a juice extractor with a pivotally mounted rotatable reamer, especially for removing the juice from citrus fruits.

Its object is to provide a device of simple construction and attractive appearance, which may be easily operated by hand, and which is an improvement over such devices as those heretofore available.

Another object of the invention is to provide a device which has few parts, is inexpensive to manufacture, requires no lubrication or adjustment, and with its parts readily movable to different relative positions to facilitate cleaning.

A further object is to provide an instrumentality for removing the juice and to ream out the pulp from the rind without crushing the rind, so that rind oils will not become mixed with the fruit juice.

This application is a continuation-in-part of an application which I filed on August 3, 1946 as Ser. No. 688,307, now abandoned.

Referring to the drawings,

Fig. 1 is a side elevation of a juice extractor made according to and embodying this invention. In this figure the cover is shown in its raised or open position;

Fig. 2 is a front elevation of the device shown in Fig. 1, with the juice receptacle removed;

Fig. 3 is a central sectional side elevation of the parts shown in Fig. 1, with the cover in its closed position;

Fig. 4 is a sectional plan view of the pedestal and cover only, the section being taken on the line 4—4 of Fig. 3;

Fig. 5 is a sectional side elevation of a removable juice receptacle;

Fig. 6 is a plan view of the receptacle;

Fig. 7 is a sectional side elevation of a strainer;

Fig. 8 is a plan view of the strainer;

Fig. 9 is a sectional plan view of a solid reamer; and

Fig. 10 is a transverse sectional view of the reamer on line 10—10 of Fig. 9, showing a sectional view of an adjacent part of the pedestal and an interposed part of a fruit. This diagrammatically illustrates the operation of the device.

20 designates a pedestal which comprises a base 21 having an upright hollow column 22 at its rear end. The column is open toward the front of the device and has side walls 23, 23, which extend down to the base 21, with straight diagonally disposed edges 24, 24. Inclined flanges 25, 25 project inwardly from the side walls. A cup-like solid-walled cavity 26 is formed in the pedestal above these flanges, with its axis normal to the edges 24, 24. From the inner surface of the cavity a number of angularly spaced ribs 27 project. These ribs lie in planes which extend radially from the axis of the cavity. At the base of the cavity an opening 28 is provided. A pair of laterally spaced lugs 29, 29 project upwardly from the top of the pedestal.

A cover 30 is pivotally connected with the upper part of the pedestal. It has a projecting portion 31, which is provided with a bore to receive a hinge pin 32 which passes through this bore and through alined bores in the lugs 29, 29. The pin is removable, so that the cover may be removed from the pedestal to facilitate the cleaning of the cover and the parts it supports. The cover has two basic functions,—that of providing a cover for the cavity 26, and that of supporting a reamer shaft 40.

First I will describe the construction and arrangement for covering the cavity 26 in the pedestal.

The cover 30 is a cup-like structure, open at the bottom except for an inwardly projecting and downwardly sloping lip 33A. Its side walls have edges 33, 33, which are adapted to abut the edges 24, 24 of the pedestal. 34, 34 are flanges which project from these edges and are adapted to enter between the side walls 23 of the pedestal (see Fig. 4). 35 is a flat surface across the ends of the side walls of the cover adjacent its hinged support, which, when the cover is closed, abuts a similar surface 24A formed on the pedestal (Figs. 2 and 9). The lower part 36 of the cover forms a shield which extends over the lower part of the cavity 26. The flat inclined lip 33A spans the side walls of the cover and, when the cover is closed, overlies the flanges 25. Thus it will be seen that, when the cover is closed, the upper part and the sides of the cavity 26 are tightly closed and that the lower part of the cavity is shielded. The lower edge of the shield 36 is designated by numeral 37.

38 is a boss in the central part of the cover. Through it is a bore, the axis of which is in alinement with the axis of the cavity 26 when the cover is closed. A strengthening rib 39 extends upwardly from the boss 38. The reamer shaft 40 extends through the bore of the boss 38 and is rotatively supported therein. 41 is a handle on the outer end of the shaft. Longitudinal movement of the shaft in this bearing is restrained by a non-positive lock, which comprises an annular groove 42 in the shaft and a ball 43 which is slidable in a transverse hole 43A in the rib 39 and is spring-pressed into the groove. This arrangement is such that when the cover is open, or removed from the pedestal, the shaft may be pushed inwardly through the cover to facilitate the cleaning of the reamer and other parts supported by the shaft.

The reamer shown in Figs. 1, 2 and 3 is mounted on the inner end of the shaft 40 and is designated by the reference numeral 44. It comprises a body 45 with angularly spaced long and short projecting ribs 46 in planes which extend radially from the axis of the shaft. As shown in the drawings, the number of ribs on the reamer differs from the number of ribs in the cavity 26. An annular flange 47 is formed at the base of the reamer. A threaded inner portion 48 of the shaft, of reduced diameter, is screwed into the body portion 45 of the reamer and a washer 49 is interposed between the reamer and a shoulder formed between the shaft 40 and its reduced portion 48.

In the specific form of construction shown in Fig. 3, the body portion 45 and the ribs 46 of the reamer are made of resilient material, such as synthetic rubber, into which is molded a metallic insert 45A, which is internally threaded to receive the reduced end 48 of the shaft. This is for a purpose which will be pointed out hereinafter, but the invention is not limited to this feature.

50 is a removable receptacle, which rests on the base 21 under the cavity 26 in the pedestal and under the shield 36 of the cover. The upper edge 51 of the inner portion of this receptacle, which is under the cavity 26, is lower than the flanges 25. The outer portion 52 of the edge is higher and adjacent the lower edge 37 of the shield 36. 53 is an outwardly extending lip which serves as a finger grip.

55 is a perforated strainer, which fits into the upper part of the receptacle 50. It has a flange 56, which rests upon the upper edge 51 of the inner portion of the receptacle, and a finger-grip flange 57 at its outer edge.

The reamer 44A, shown in Figs. 9 and 10, is made of a suitable rigid material, such as metal. It has an internally threaded hole 48A for receiving the end 48 of the shaft.

When the parts are in the positions shown in Fig. 1, a half of an orange or other fruit is inserted in the cup-like cavity 26. The handle 41 is then swung about the axis of the pin 32 to close the cover and to bring the reamer into contact with the inside of the fruit. The distance of the handle 41 from the pin 32 is greater than the distance of the reamer from the pin, so that a leverage is provided to force the reamer into the fruit under greater pressure than that applied to the handle. This pressure alone will remove much of the juice from the fruit. With my device, however, the juice extraction may be augmented by rotation of the reamer by turning of the handle in either direction, or alternately in opposite directions. The ribs 27 in the cavity 26 tend to prevent the fruit from turning, and the ribs 46 of the reamer squeeze the pulp on the rind without distorting the rind sufficiently to extract any of the oils therefrom. The fruit juices thus extracted will run down through the opening 28 into the receptacle 50 through the strainer 55. It is to be noted that the annular rim 47 of the reamer will deflect the extracted juices laterally and that the side walls of the cover and the pedestal will prevent them from squirting out of the device. The flanges 34, 34 of the cover, which extend between the side walls 23 of the pedestal, will prevent such squirting even before the cover fully reaches its closed position. The flanges 25, 25 deflect the extracted juices into the receptacle 50. Any juices that may gather upon the inner surface of the cover will run down said surface and be directed into the strainer by the lip 33A. It will be noted that when the cover is closed the lip 33A overlies the flanges 25, 25. Of course, the reamed-out rind can be removed and another half fruit inserted into the cavity 26, and the operation repeated.

The thickness of fruit rinds varies considerably and, when a reamer is made of rigid material, it is necessary to make the minimum clearance between the reamer ribs 46 and the inner surface of the cavity 26 large enough to accommodate the thick-skinned fruits.

By making the body and the ribs of the reamer of resilient material, this minimum clearance may be much smaller, as such a reamer is capable of considerable distortion and is also capable of conforming itself to the shape of the rind upon which it is operating. The purpose of having unlike numbers of ribs on the parts abutting opposite sides of a rind is to avoid the possibility of more than one pair of such ribs becoming alined simultaneously, and thus increasing the resistance to the rotary motion of the reamer.

When a rigid reamer like that shown in Figs. 9 and 10 is used, the projecting ribs of the stationary cup-like member may have obliquely pointed cross-sectional contours and the projections from the reamer may have a flattened wavy contour, as shown in Fig. 10. In this Fig. 10, X designates a section of a piece of fruit interposed between the cavity 26 and a reamer 44A. When one of the ribs of the reamer, such as designated by the letter A, is in alinement with a rib 27A in the cavity, the other ribs of said cavity and of the reamer are out of alinement. From an inspection of this figure it will be seen that when the reamer is rotated in either direction the inside of the fruit will be forced outwardly under alternately different degrees of pressure, which results in a progressive action that crushes the vesicles of the fruit and effectively removes its juices. During this operation the outside of the fruit is not subjected to a similar distortion, so that practically none of the oils in the rind will be extracted and mixed with the extracted juices.

Various modifications in construction, mode of operation, method and use of an invention may and do occur to others, especially after benefiting from knowledge of such disclosure as that herein presented, of the principles involved, but the invention itself is not confined to the present showing.

I claim:

1. A juice extractor, comprising a stationary member having a cup-like cavity formed therein, internal projections lying in angularly spaced axial planes in said cavity, a rotatable reamer member having external projections therein lying in axial planes having different angular spacing than that of said internal projections so that only one of the internal projections can register with but one of the external projections at one time, means for bringing said members into cooperative relation with a part of a fruit interposed between them, and means for rotating the reamer to bring each of the projections thereon into successive registration with the projections in said cup-like cavity.

2. A juice extractor, comprising a stationary member having a cup-like cavity formed therein, sharp-edged internal projections lying in angularly spaced axial planes in said cavity, a rotatable reamer member having wave-like external projections thereon lying in axial planes having different angular spacing than that of said internal projections so that only one of the internal projections can register with but one of the external projections at one time, means for bringing said members into cooperative relation with a part of a fruit interposed between them, and means for rotating the reamer to bring each of the projections thereon into successive registration with the projections in said cup-like cavity.

3. In a juice extractor, a stationary frame comprising a base, a supporting pedestal extending upwardly from the base and having a solid-walled cup-like cavity formed in the upper part of the pedestal as an integral part thereof, side walls extending downwardly from the edges of the cavity, a cover member pivoted to the pedestal above the cavity therein, said cover member having edges adapted to be seated on the side walls of the pedestal when the cover member is closed and an intermediate portion forming a shield overlying the cavity, a shaft passing through and rotatably supported in said intermediate portion of the cover member and longitudinally slidable therein, a non-positive lock for holding the reamer close to the cover member and restraining the longitudinal movement of the shaft, a reamer at one end of the shaft, and a handle at the other end of the shaft.

ARTHUR MERRICK STONER.

REFERENCES CITED

The following references are of record in the file of this patent:

UNITED STATES PATENTS

| Number | Name | Date |
|---|---|---|
| 593,548 | Baumgarten et al. | Nov. 9, 1897 |
| 628,254 | Savage | July 4, 1899 |
| 669,954 | Coomber | Mar. 12, 1901 |
| 722,898 | Redlinger, Jr. | Mar. 17, 1903 |
| 785,727 | Gilchrist | Mar. 28, 1905 |
| 1,234,146 | Du Boe | July 4, 1917 |
| 1,898,945 | Fitzgerald | Feb. 21, 1933 |
| 2,131,290 | Kochner et al. | Sept. 27, 1938 |
| 2,274,306 | Smith | Feb. 24, 1942 |

FOREIGN PATENTS

| Number | Country | Date |
|---|---|---|
| 305,374 | Italian | Feb. 3, 1933 |